US008826755B2

(12) United States Patent
Hsu et al.

(10) Patent No.: US 8,826,755 B2
(45) Date of Patent: Sep. 9, 2014

(54) ADJUSTMENT MECHANISM FOR AN OPTICAL MODULE

(75) Inventors: Bo-Chun Hsu, Tao Yuan Shien (TW);
Wan-Chi Lin, Tao Yuan Shien (TW);
Yi-Sheng Yu, Tao Yuan Shien (TW);
Wen-Ji Tsai, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 311 days.

(21) Appl. No.: 13/170,902

(22) Filed: Jun. 28, 2011

(65) Prior Publication Data
US 2012/0227521 A1  Sep. 13, 2012

(30) Foreign Application Priority Data

Mar. 7, 2011  (TW) .............................. 100107544 A (51) Int. Cl.
*F16H 27/02* (2006.01)
*G02B 7/00* (2006.01)

(52) U.S. Cl.
CPC ..................................... *G02B 7/003* (2013.01)
USPC .............................................. 74/89; 248/448

(58) Field of Classification Search
USPC ............... 74/89.23, 89.24, 89.32, 89.33, 469, 74/470, 490.08, 490.09, 813 R, 825; 248/448, 449, 454
See application file for complete search history.

(56) References Cited

U.S. PATENT DOCUMENTS

| 3,075,395 | A | * | 1/1963 | Leland et al. ..................... 74/89 |
| 3,357,268 | A | * | 12/1967 | Richter ......................... 74/89.23 |
| 3,434,358 | A | * | 3/1969 | Wildy et al. ..................... 74/103 |
| 3,478,608 | A | * | 11/1969 | Met .............................. 74/89.23 |
| 3,520,203 | A | * | 7/1970 | Hill .............................. 74/89.29 |
| 3,895,543 | A | * | 7/1975 | Metzger et al. ............. 74/89.23 |
| 4,065,032 | A | * | 12/1977 | Lydiksen ....................... 222/77 |
| 4,236,415 | A | * | 12/1980 | Musial ............................ 74/25 |
| 5,345,832 | A | * | 9/1994 | Takei ............................. 74/89 |
| 6,684,728 | B2 | * | 2/2004 | Higuchi et al. ............ 74/424.91 |
| 2006/0016280 | A1 | * | 1/2006 | Hasegawa et al. .......... 74/89.23 |
| 2012/0031209 | A1 | * | 2/2012 | Nagaoka et al. ................ 74/89 |
| 2013/0008268 | A1 | * | 1/2013 | Hodge et al. ............... 74/89.23 |

* cited by examiner

*Primary Examiner* — Troy Chambers
*Assistant Examiner* — Zakaria Elahmadi
(74) *Attorney, Agent, or Firm* — McClure, Qualey & Rodack, LLP (57) ABSTRACT

An adjustment mechanism. At least one guide track is connected to a base. At least one spring is fit on the guide track. A slider is fit on the guide track. The spring is abutted between the base and the slider. A fixed member is fixed to the base. The slider is slidably disposed between the spring and the fixed member. A displacement adjustment bolt is screwed in the fixed member. A first rotator is fit in the slider and includes a section. A second rotator is fit on and engages the first rotator. The second rotator abuts the slider. A fixing bolt detachably abuts the second rotator and is detachably fastened to the first rotator. An adjuster is connected to the first rotator, adjusting the position of a target.

7 Claims, 7 Drawing Sheets

ADJUSTMENT MECHANISM FOR AN OPTICAL MODULE

CROSS REFERENCE TO RELATED APPLICATIONS

This Application claims priority of Taiwan Patent Application No. 100107544, filed on Mar. 7, 2011, the entirety of which is incorporated by reference herein.

BACKGROUND OF THE INVENTION

1. Field of the Invention

The invention relates to an adjustment mechanism, and more particularly to an adjustment mechanism for adjusting the relative position between members within an optical module.

2. Description of the Related Art

To achieve a desired optical performance, the relative position between members in an optical module of an optical device (e.g. camera, cellular phone, and image-capturing unit of an optical touch screen) must be adjusted by specific adjustment mechanisms.

Nevertheless, a conventional adjustment mechanism provides only functions of unidirectional adjustment. Namely, the conventional adjustment mechanism can perform only movement operations along one direction or one axis, such that the adjustment of the relative position between the members in the optical module is inconvenient and complex.

Hence, there is a need for an adjustment mechanism capable of operating with three directions, facilitating adjustment of the relative position between members within an optical module.

BRIEF SUMMARY OF THE INVENTION

A detailed description is given in the following embodiments with reference to the accompanying drawings.

An exemplary embodiment of the invention provides an adjustment mechanism comprising a base, at least one guide track, at least one spring, a slider, a fixed member, a displacement adjustment bolt, a first rotator, a second rotator, a fixing bolt, and an adjuster. The guide track is connected to the base. The spring is fit on the guide track. The slider is fit on the guide track. The spring is abutted between the base and the slider. The fixed member is fixed to the base. The slider is slidably disposed between the spring and the fixed member. The displacement adjustment bolt is screwed in the fixed member. The first rotator is fit in the slider and comprises a section. The second rotator is fit on and engages the first rotator. The second rotator abuts the slider. The fixing bolt detachably abuts the second rotator and is detachably fastened to the first rotator. The adjuster is connected to the first rotator, adjusting the position of a target.

The fixed member is fit on the guide track.

The adjustment mechanism further comprises an angle adjustment bolt screwed in the second rotator and abutting the section of the first rotator.

The adjustment mechanism further comprises a height fixing bolt screwed in the adjuster and detachably abutting the first rotator.

The adjustment mechanism further comprises a positioning nut screwed on the displacement adjustment bolt and detachably abutting the fixed member, fixing the displacement adjustment bolt.

The first rotator protrudes from two opposite surfaces of the slider.

The adjuster comprises at least one adjustment pin inserted into the target.

The target comprises an optical sensor.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Referring to FIGS. 1-5, an adjustment mechanism 100 comprises a base 110, two opposite guide tracks 120, two springs 130, a slider 140, a fixed member 150, a displacement adjustment bolt 160, a positioning nut 165, a first rotator 171, a second rotator 172, an angle adjustment bolt 175, a fixing bolt 180, an adjuster 190, and a height fixing bolt 195.

Figure 1:
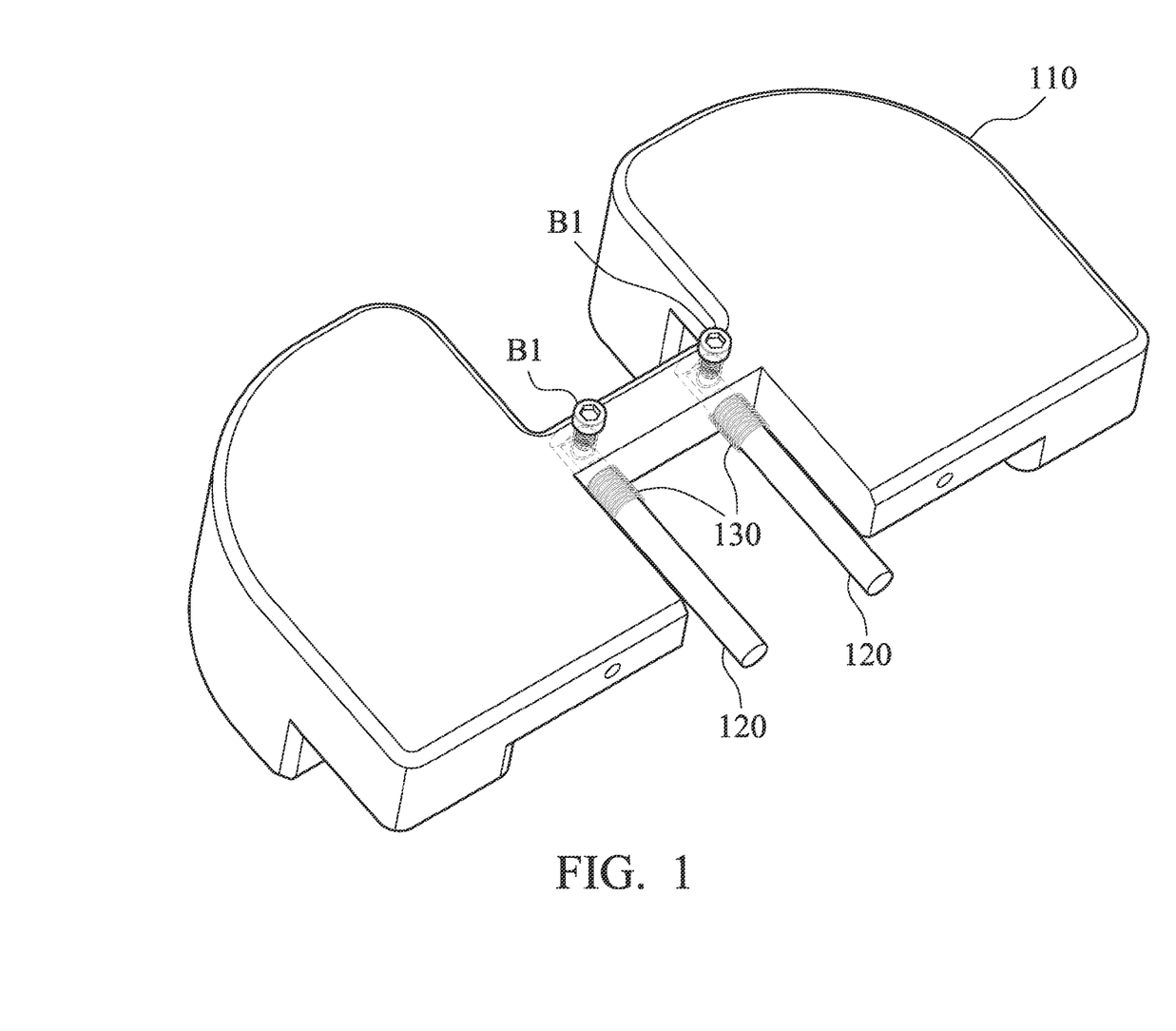
FIGS. 1-5 are schematic views showing an assembly process of an adjustment mechanism of the invention.

As shown in FIG. 1, the guide tracks 120 are connected to the base 110. Specifically, the guide tracks 120 are fit in the base 110, and two bolts B1 are fit in the base 110 to respectively abut the guide tracks 120, such that the guide tracks 120 can be connected to the base 110. Moreover, the springs 130 are fit on the guide tracks 120, respectively.

Figure 2:
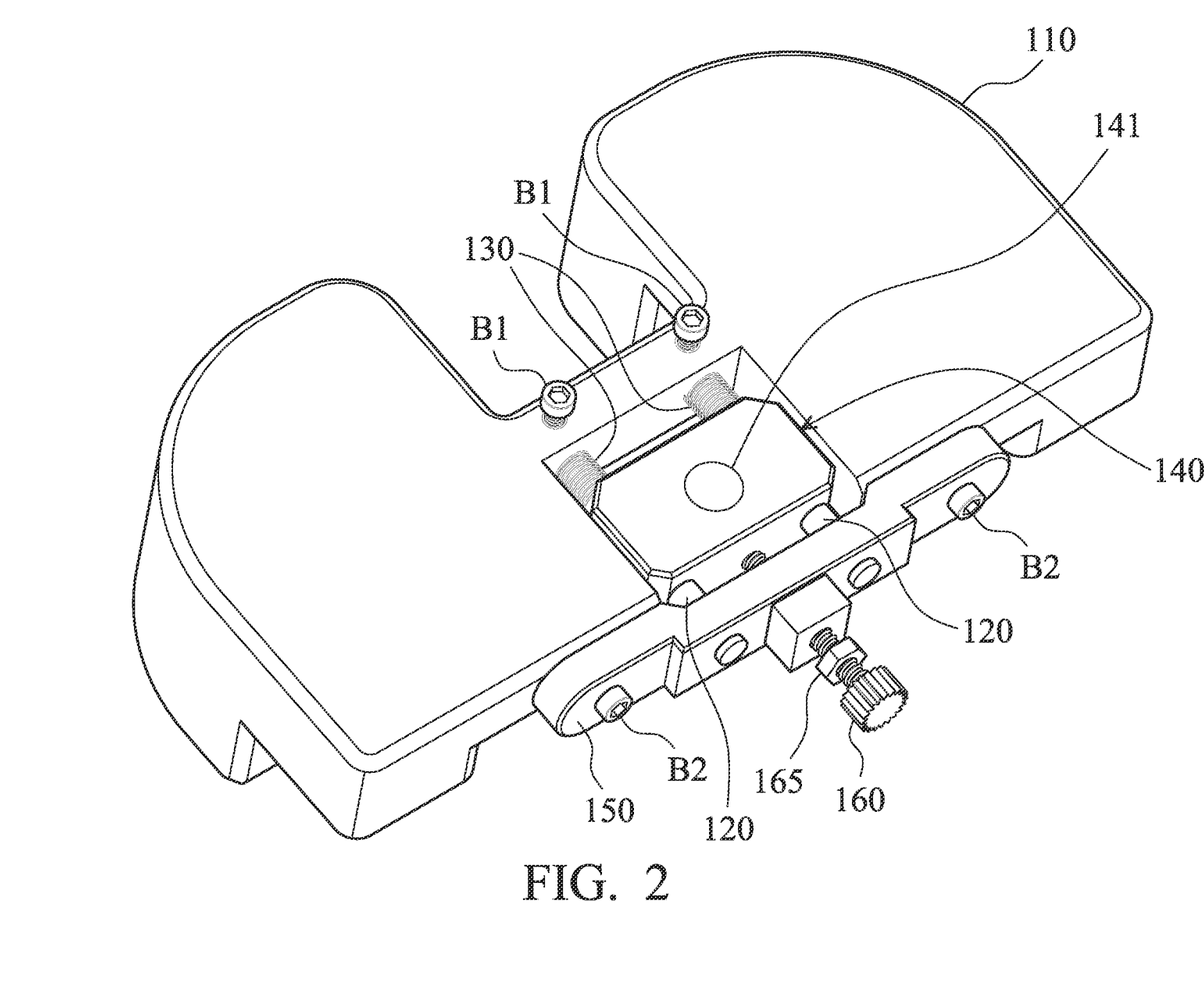

As shown in FIG. 2, the slider 140 is fit on the guide tracks 120 and comprises a through hole 141. Here, the springs 130 are abutted between the base 110 and the slider 140. In this embodiment, the springs 130 are maintained in a compressed status.

The fixed member 150 is fixed to the base 110 by two bolts B2. Here, the slider 140 is slidably disposed between the springs 130 and the fixed member 150. Moreover, in this embodiment, the guide tracks 120 pass through the fixed member 150.

The displacement adjustment bolt 160 is screwed in the fixed member 150 and penetrates the fixed member 150 to abut the slider 140. Here, the displacement adjustment bolt 160 can control and adjust movement of the slider 140 with respect to the base 110.

The positioning nut 165 is screwed on the displacement adjustment bolt 160 and detachably abuts the fixed member 150. Here, the positioning nut 165 can fix the displacement adjustment bolt 160, thereby fixing the position of the slider 140 with respect to the base 110. Specifically, by friction between the positioning nut 165 and the fixed member 150, the position of the displacement adjustment bolt 160 can be properly fixed, thus preventing the position of the slider 140 from being changed due to other adjustment operations or application of improper force.

Figure 3:
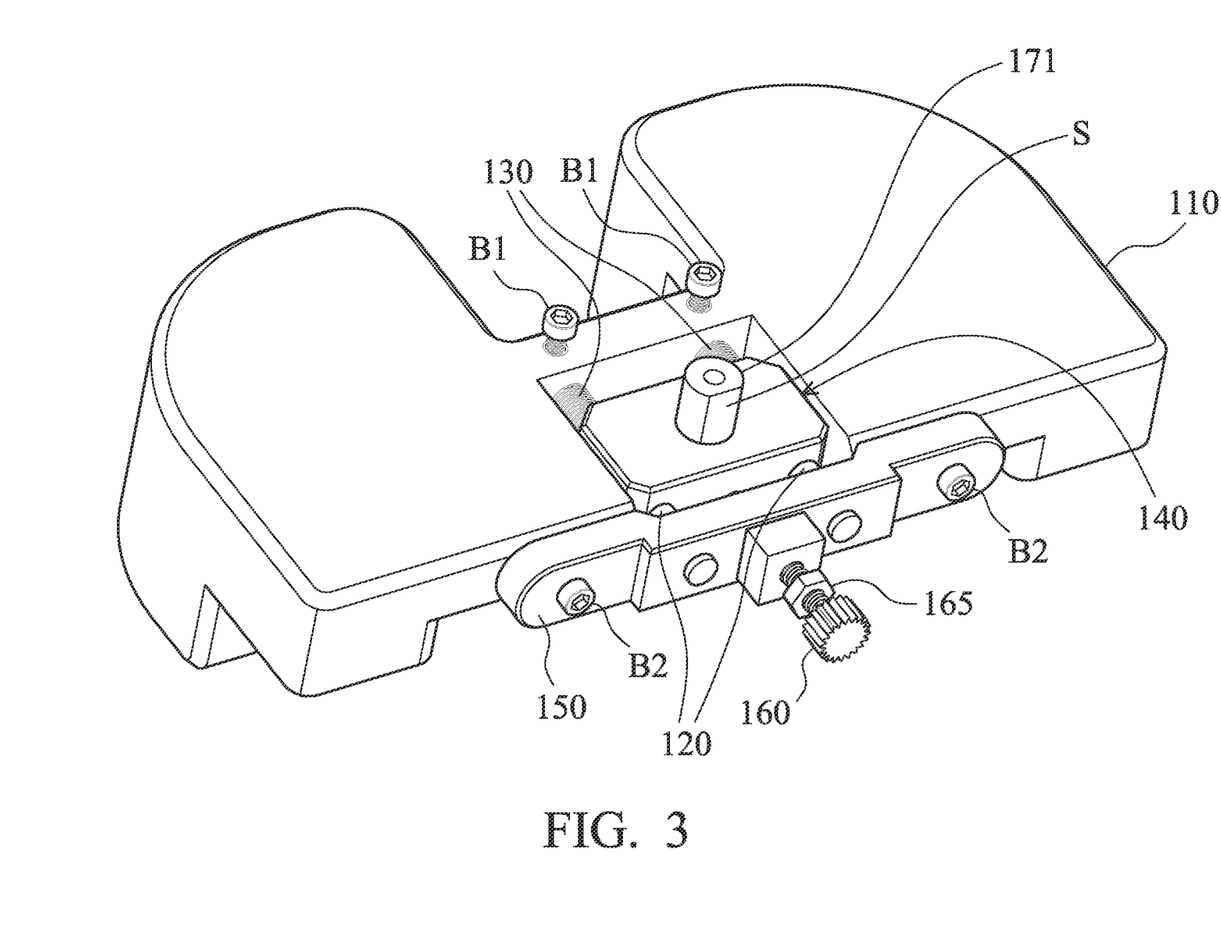
Figure 6:
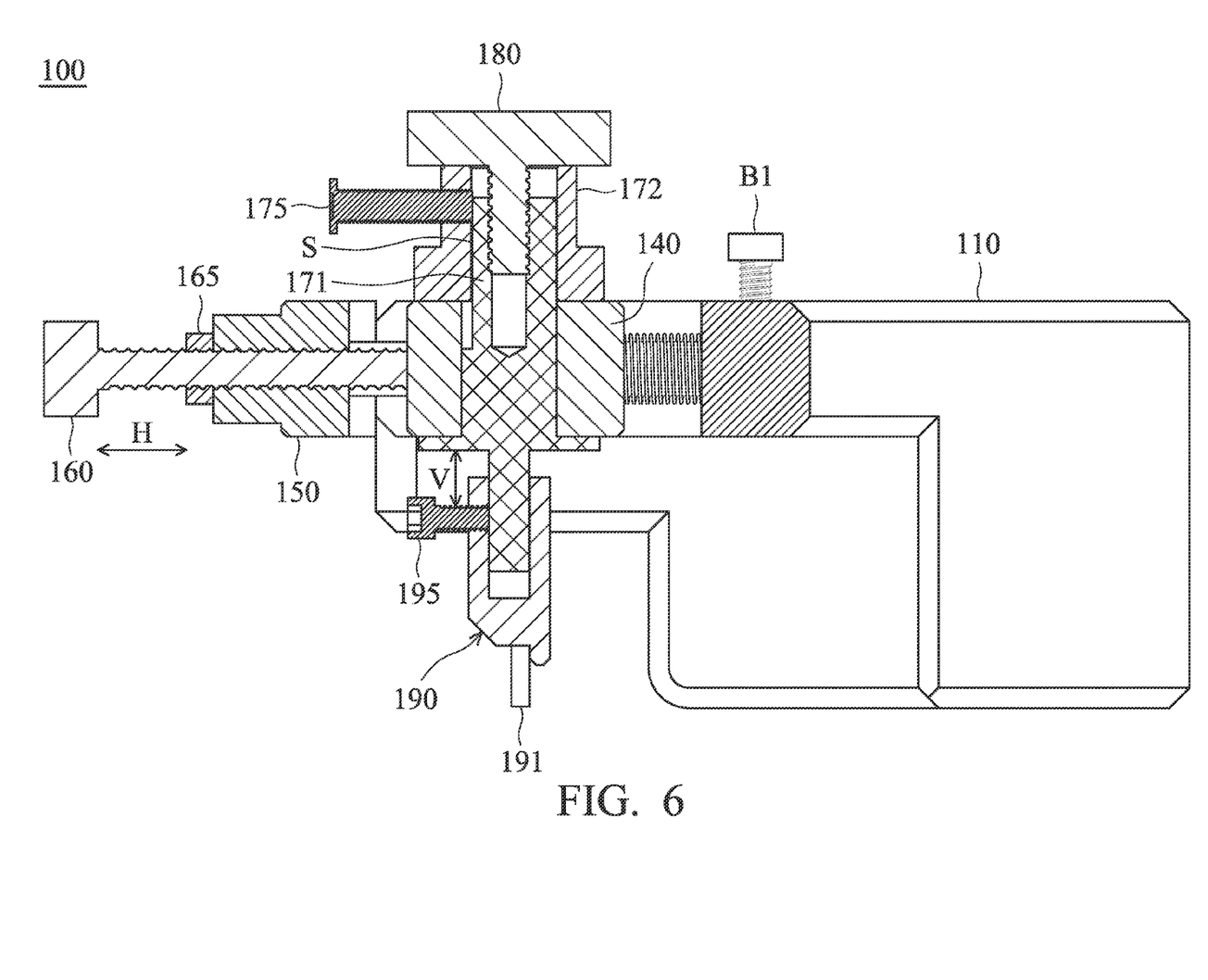
FIG. 6 is a schematic cross section of the adjustment mechanism of the invention.

As shown in FIG. 3, the first rotator 171 is fit in the through hole 141 of the slider 140 and protrudes from two opposite surfaces (i.e. the top and bottom surfaces, as shown in FIG. 6) of the slider 140. Moreover, the first rotator 171 comprises a section S abutting an end surface of the angle adjustment bolt 175 (as shown in FIG. 6).

Figure 4:
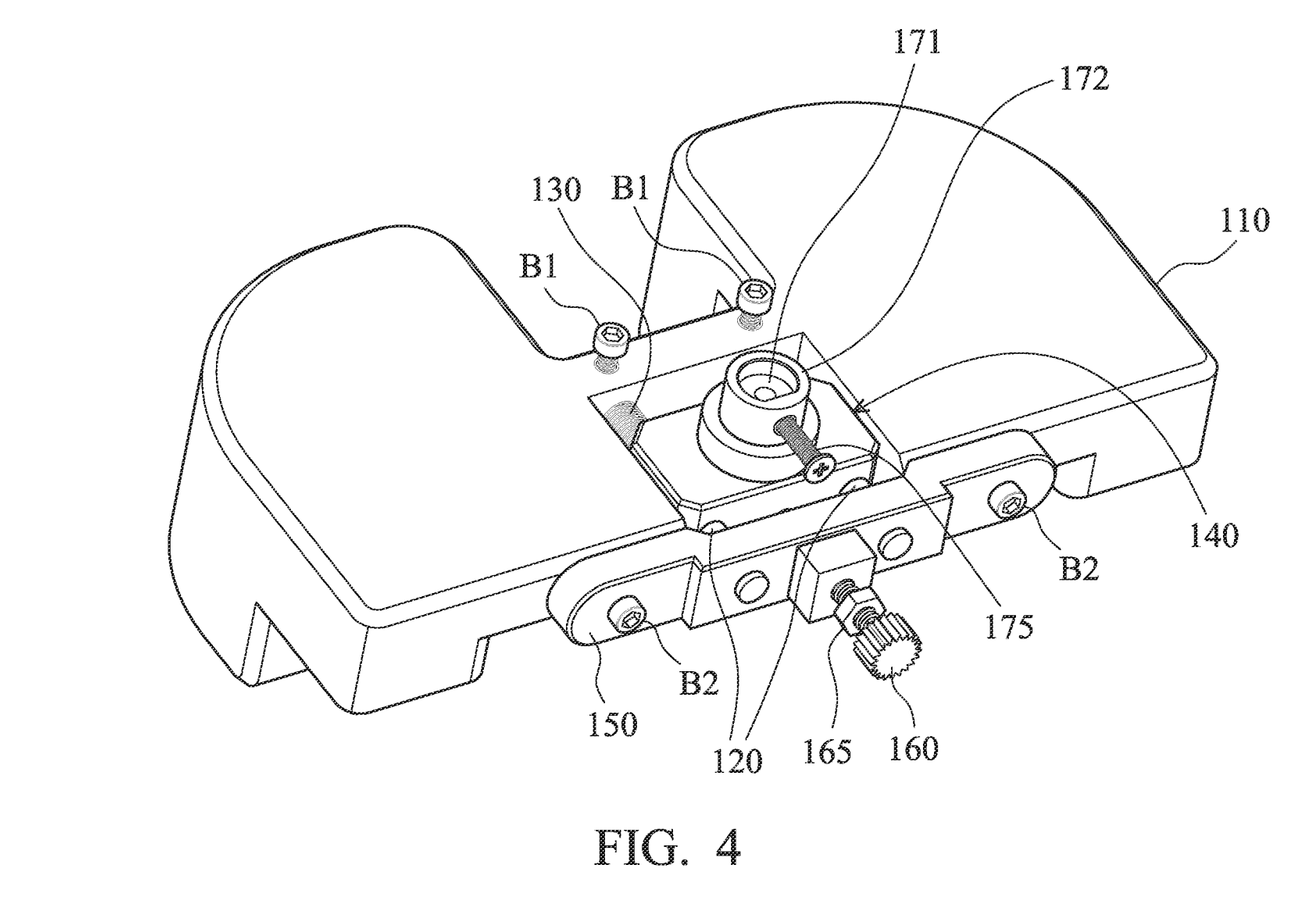

As shown in FIG. 4, the second rotator 172 is fit on and engages the first rotator 171. Here, as an internal profile of the second rotator 172 corresponds to an external profile of a part, protruding from the top surface of the slider 140, of the first rotator 171, the second rotator 172 fit on the first rotator 171 can simultaneously engage the first rotator 171. Moreover, in this embodiment, the second rotator 172 abuts (the top surface of) the slider 140.

The angle adjustment bolt 175 is screwed in the second rotator 172 and detachably abuts the first rotator 171. Specifically, the angle adjustment bolt 175 penetrates the second rotator 172 to detachably abut the section S of the first rotator 171.

Figure 5:
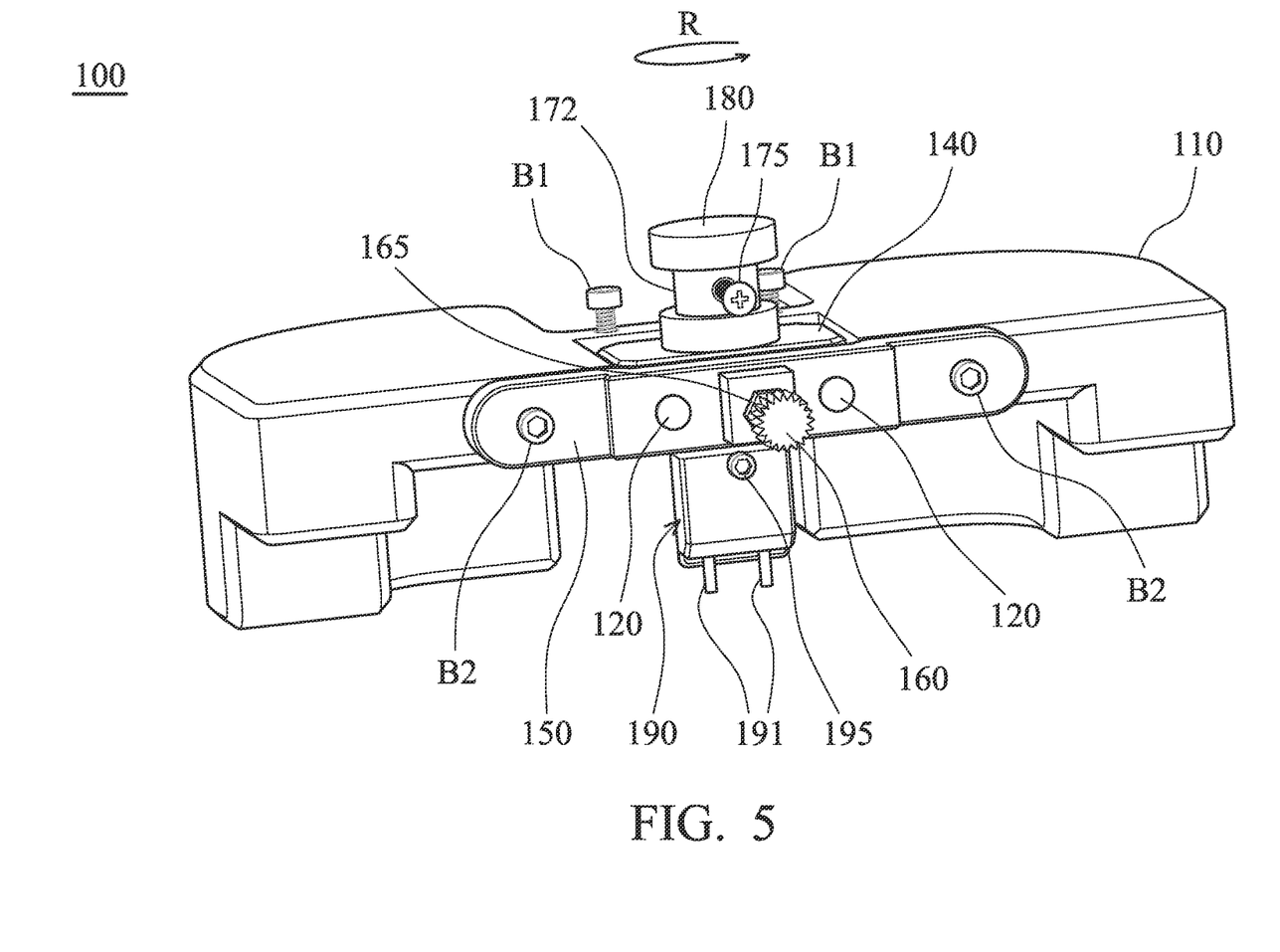

As shown in FIG. 5, the fixing bolt 180 detachably abuts the second rotator 172 and is detachably fastened to the first rotator 171.

The adjuster 190 is connected to the first rotator 171, adjusting the position of a target (not shown, e.g. an optical sensor). Specifically, the adjuster 190 is connected to a part, protruding from the bottom surface of the slider 140, of the first rotator 171. Moreover, the adjuster 190 comprises two adjustment pins 191 inserted into the target.

The height fixing bolt 195 is screwed in the adjuster 190 and detachably abuts the first rotator 171, fixing the position of the adjuster 190 with respect to the first rotator 171.

The following description is directed to operation for adjusting the relative position between members within an optical module using the adjustment mechanism 100.

For example, when the adjustment mechanism 100 adjusts the position of an optical sensor (i.e. the target, such as, a CCD), with respect to a glass substrate, disposed in an optical module, the adjustment pins 191 of the adjuster 190 are inserted into the optical sensor. Here, the adjustment pins 191, in fact, are inserted into a circuit board to which the optical sensor is attached.

In regard to height adjustment of the optical sensor with respect to the glass substrate, as shown in FIG. 5 and FIG. 6, the height fixing bolt 195 is rotated to separate from the first rotator 171. At this point, the adjuster 190 can move upward and downward with respect to the first rotator 171 along a vertical direction V, thereby moving the optical sensor upward and downward. After the height of the optical sensor is adjusted to a desired level, the height fixing bolt 195 can be rotated in reverse to abut the first rotator 171, fixing the adjuster 190. At this point, the height adjustment of the optical sensor with respect to the glass substrate is complete.

Figure 7:
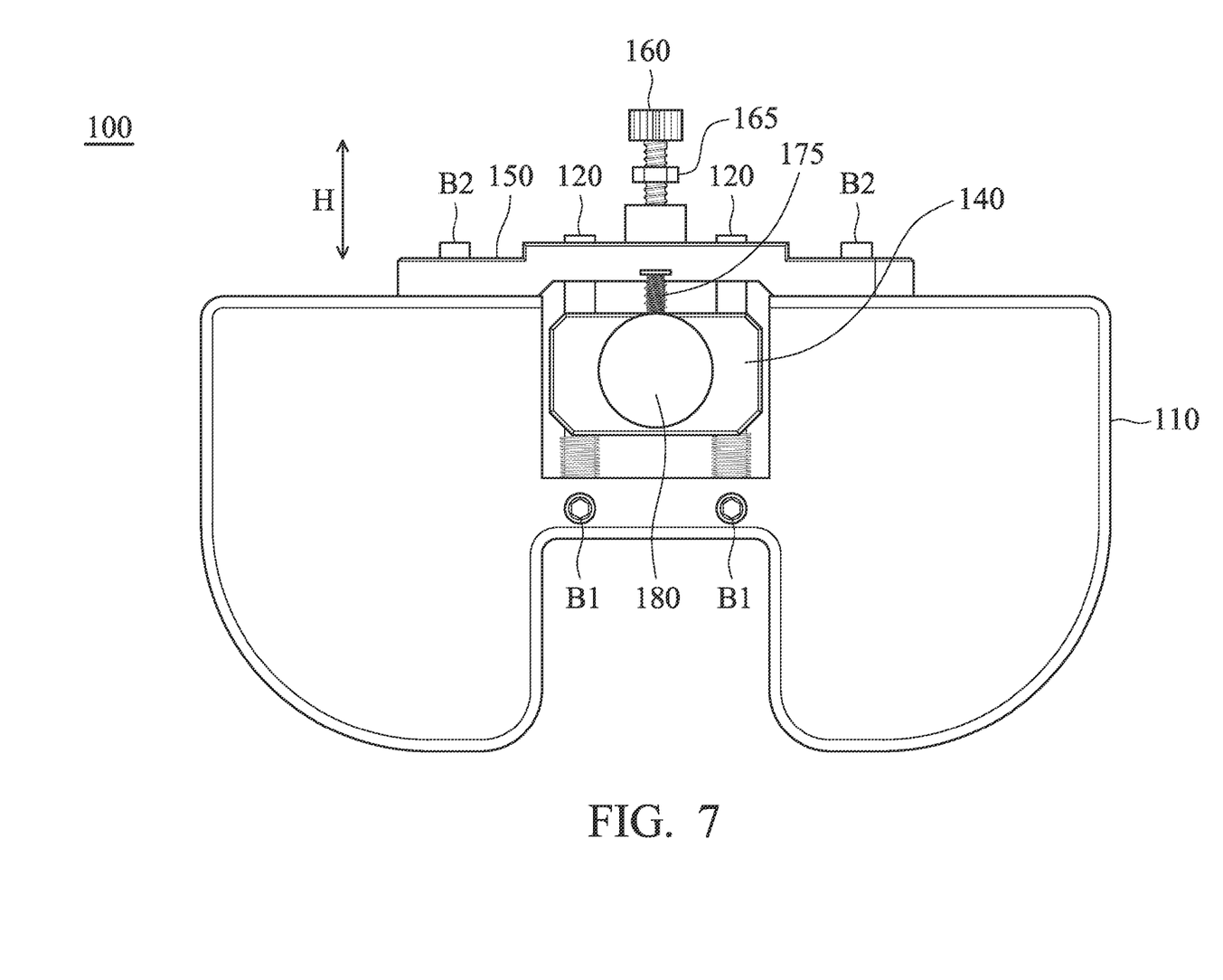
FIG. 7 is a schematic plane view of the adjustment mechanism of the invention in an operational mode.

In regard to horizontal adjustment of the optical sensor with respect to the glass substrate, as shown in FIG. 7, the positioning nut 165 is rotated to separate from the fixed member 150. Then, the displacement adjustment bolt 160 can be rotated clockwise or counterclockwise. Here, as the springs 130 are maintained in the compressed status, resilience provided by the springs 130 forces the slider 140 to persistently abut the displacement adjustment bolt 160, no matter how the displacement adjustment bolt 160 is rotated. Namely, when the displacement adjustment bolt 160 is rotated clockwise or counterclockwise, the slider 140 associated with the first rotator 171 can move forward and backward with respect to the base 110 along a horizontal direction H, forcing the adjuster 190 connected to the first rotator 171 to move horizontally, and further forcing the optical sensor to move horizontally. Accordingly, when the optical sensor is adjusted to reach a desired horizontal position, the positioning nut 165 can be rotated to again abut the fixed member 150, fixing the position of the displacement adjustment bolt 160, and further fixing the position of the optical sensor. At this point, the horizontal adjustment of the optical sensor with respect to the glass substrate is complete.

In regard to angle adjustment of the optical sensor with respect to the glass substrate, as shown in FIG. 5 and FIG. 6, the fixing bolt 180 is rotated to separate from the first rotator 171. Then, the angle adjustment bolt 175 is rotated in a rotation direction R. At this point, as the angle adjustment bolt 175 penetrates the second rotator 172 to abut the section S of the first rotator 171 and the second rotator 172 engages the first rotator 171, the angle adjustment bolt 175 drives the second rotator 172 and first rotator 171 to rotate simultaneously, forcing the adjuster 190 connected to the first rotator 171 to rotate in the rotation direction R, and further forcing the optical sensor into which the adjustment pins 191 of the adjuster 190 are inserted to rotate. Accordingly, when the optical sensor is adjusted to reach a desired angle, the fixing bolt 180 can be reversely rotated to again abut the second rotator 172. Here, the second rotator 172 tightly abuts the slider 140, fixing the rotation angle of the second rotator 172 and first rotator 171, and thereby fixing the rotation angle of the adjuster 190 and optical sensor. At this point, the angle adjustment of the optical sensor with respect to the glass substrate is complete.

In conclusion, as the disclosed adjustment mechanism can be operated with three directions (i.e. the vertical direction V, horizontal direction H, and rotation direction R) to adjust the position of a target, the adjustment of the relative position between the members within the optical module is convenient and simplified.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adjustment mechanism, comprising:
   a base;
   at least one guide track connected to the base;
   at least one spring fit on the guide track;
   a slider fit on the guide track, wherein the spring is abutted between the base and the slider;
   a fixed member fixed to the base and fit on the guide track, wherein the slider is slidably disposed between the spring and the fixed member;
   a displacement adjustment bolt screwed in the fixed member;
   a first rotator fit in the slider;
   a second rotator fit on and engaging the first rotator, wherein the second rotator abuts the slider, and an elastically deforming direction of the spring is perpendicular to a combining direction of the first and second rotators;
   a fixing bolt detachably abutting the second rotator and detachably fastened to the first rotator; and
   an adjuster connected to the first rotator, adjusting the position of a target,
   wherein when the displacement adjustment bolt is rotated, the slider associated with the first rotator moves in a horizontal direction with respect to the base and forces the adjuster connected to the first rotator to move horizontally.

2. The adjustment mechanism as claimed in claim 1, further comprising an angle adjustment bolt screwed in the second rotator and abutting a section of the first rotator.

3. The adjustment mechanism as claimed in claim 1, further comprising a height fixing bolt screwed in the adjuster and detachably abutting the first rotator.

4. The adjustment mechanism as claimed in claim 1, further comprising a positioning nut screwed on the displacement adjustment bolt and detachably abutting the fixed member, fixing the displacement adjustment bolt.

5. The adjustment mechanism as claimed in claim 1, wherein the first rotator protrudes from two opposite surfaces of the slider.

6. The adjustment mechanism as claimed in claim 1, wherein the adjuster comprises at least one adjustment pin inserted into the target.

7. The adjustment mechanism as claimed in claim 6, wherein the target comprises an optical sensor.

* * * * *